Sept. 16, 1969    J. B. SMITH    3,467,141
FLANGE COUPLING REPAIR RING
Filed Jan. 9, 1967    2 Sheets-Sheet 1
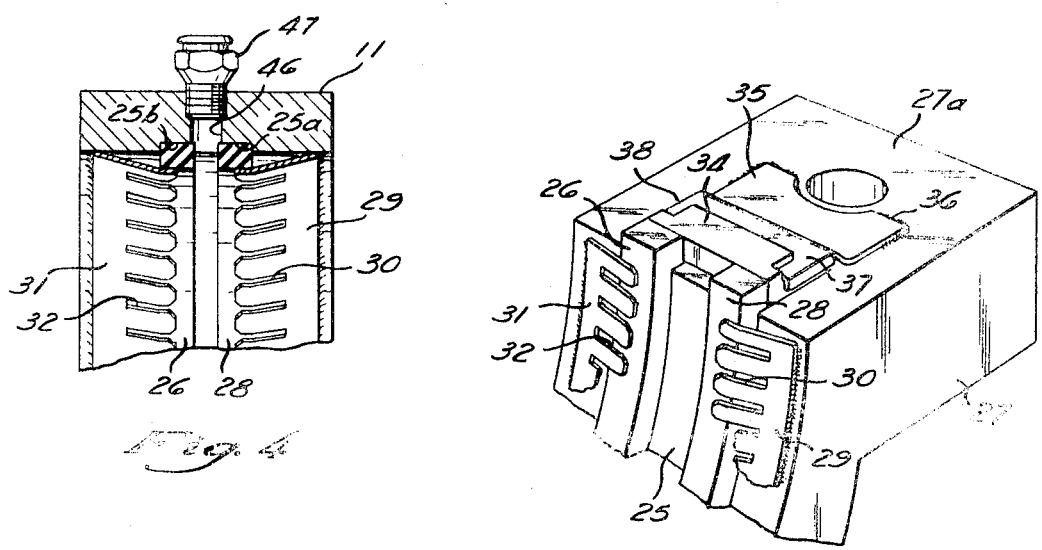
Fig. 4
Fig. 5
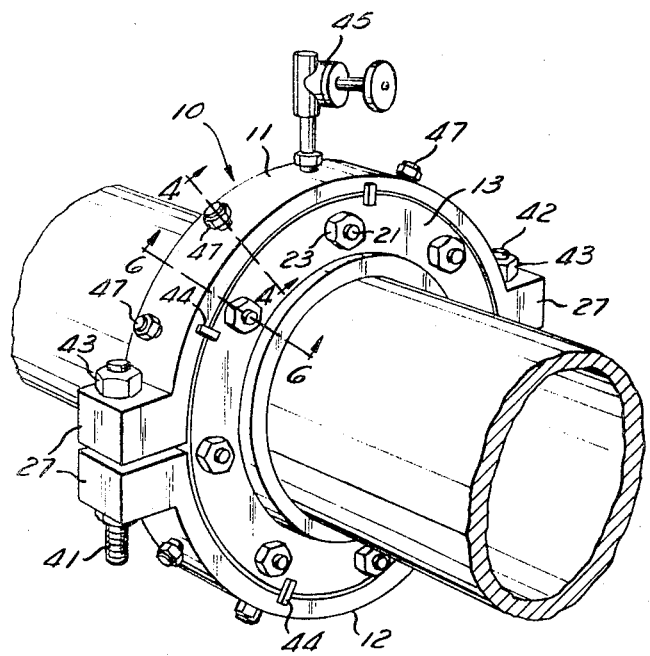
Fig. 1
INVENTOR
JOSEPH B. SMITH
BY
McNENNY, FARRINGTON, PEARNE & GORDON
ATTORNEYS Sept. 16, 1969   J. B. SMITH   3,467,141
FLANGE COUPLING REPAIR RING
Filed Jan. 9, 1967   2 Sheets-Sheet 2
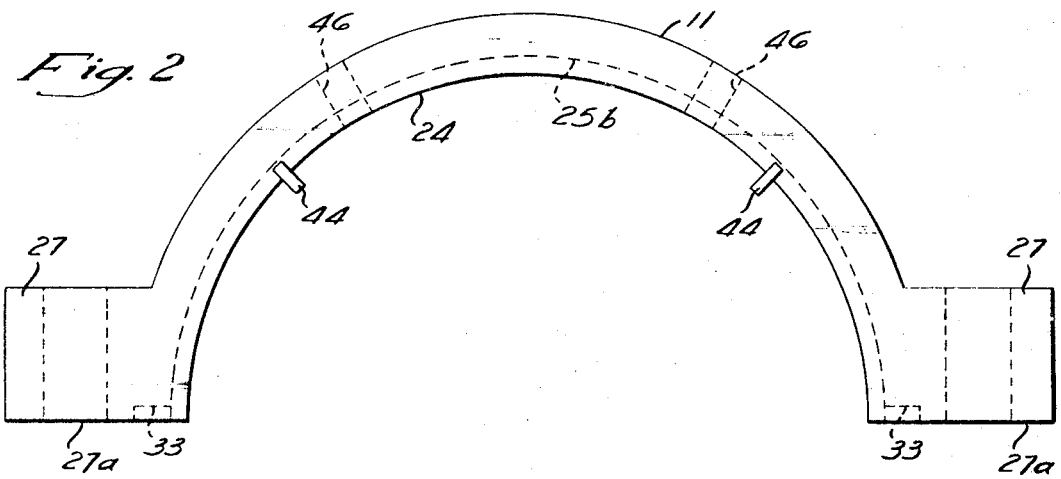
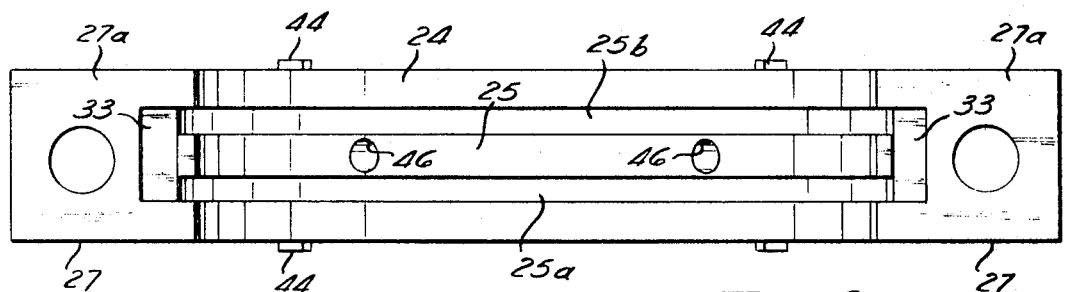
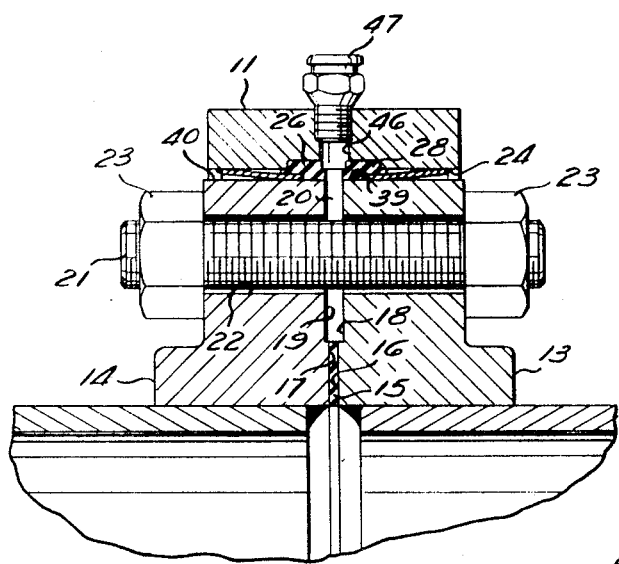
INVENTOR
JOSEPH B. SMITH
BY
McNENNY, FARRINGTON, PEARNE, & GORDON
ATTORNEYS

United States Patent Office 3,467,141
Patented Sept. 16, 1969

3,467,141
FLANGE COUPLING REPAIR RING
Joseph B. Smith, 5350 W. 130th St.,
Cleveland, Ohio 44130
Filed Jan. 9, 1967, Ser. No. 608,090
Int. Cl. F16l 55/18, 17/04
U.S. Cl. 138—97            6 Claims

ABSTRACT OF THE DISCLOSURE

A method and apparatus for the on-site sealing of leaking, flanged pipe joints. Semicylindrical body members are placed around the leaking flanged coupling and are joined at their ends to form a cylindrical coupling member about the joint. Gasket means are provided within the cylindrical coupling member to form a seal between the cylindrical coupling member and the periphery of the pipe joint. A sealant is introduced under pressure into the zone defined by the cylindrical coupling member, the flanged joint and the gasket means.

BACKGROUND OF THE INVENTION

This invention relates to pipe couplings for sealing off leaks in pipes between abutting flanges and, more particularly, to a pipe coupling which may be applied on site to a leaking pipe without shutting off the flow within the pipe while such repairs are being made. Many techniques have been proposed for the on-site sealing of a leaking joint. One such technique involves the step of completely surrounding the joint with a cementitious, moldable substance which is molded about the entire joint and portions of the adjacent pipes. Such a technique, however, forms a seal which is difficult to break when the joined pipes are to be replaced. Moreover, it is difficult, if not impossible, according to these techniques to apply the moldable substance about joints having high pressure and/or temperature leaks.

Because of the difficulties involved in applying a moldable substance to such a leaking pipe joint, it has been proposed to seal such joints by mechanical coupling means. One such coupling means is shown in my prior U.S. Patent No. 3,017,204. In my prior patent, a split coupling is disclosed which effectively seals a joint formed by axially butted pipes. The split coupling circumferentially seals both ends of the coupling against axial leakage along the pipe and thereby effectively seals the butted pipe joint.

It is particularly difficult to seal a bolted flange type pipe joint, since such a joint has leakage paths which not only comprise the circumferential butt seam between the flanges but also include the zones between each flange bolt and its bolt hole. Heretofore, leaking flange joints have been sealed by completely surrounding the flange joint with a moldable substance but, as was previously indicated, such an operation forms a seal which is difficult to remove in the event that a pipe section is to be replaced. As was also indicated, it is substantially impossible to mold such substances over a flange which is leaking high temperature and/or pressure fluid. Even in those situations involving a low pressure and/or temperature fluid leak, it is frequently impossible to encase the pipe flanges with a moldable sealant due to space limitations which prevent encasement of the flange and flange bolts. It has been proposed to seal leaking flanged pipe joints by blocking off the area surrounding a flange bolt which is adjacent to the leak and then forcing a fluid sealant between a flange bolt and its bolt hole and into the leaking area between the pipe flanges. Although this technique has been partially successful, it involves forcing the fluid sealant in countercurrent relationship with respect to the leaking fluid and, in many instances, does not entirely seal the leak path.

The prior art attempts to seal flanged pipe joints have been inspired by the dilemma involved where such a pipe joint is leaking. Plant maintenance personnel could, of course, repair such a leak by dismantling the flange coupling, replacing the gasket, and performing other necessary repair work. However, such an operation would require shutdown of the pipe line and, consequently, a possible shutdown of the entire plant. In addition, in high temperature lines, cooling due to shutdown will often cause additional leaks at other joints in the line. It is less expensive, therefore, to tolerate the leak until the normal maintenance shutdown of the plant. The plant, therefore, may tolerate fluid loss through leaking pipe joints, which may cost hundreds of dollars per day, rather than shutting down the plant, which may involve hundreds of dollars per hour.

When such leaking joints are repaired during the normal maintenance shutdowns, it is often found that the leaking fluid has eroded large portions of the mating flanges so that the entire assembly must be replaced.

SUMMARY

This invention overcomes many of these prior art problems by providing a pipe repair coupling which may be applied to a flanged, leaking pipe joint on site, which will stop the leak until the pipe joint may be repaired during normal maintenance shutdowns.

It is an object of this invention to provide a repair coupling which overcomes many of the disadvantages of the above prior art couplings.

It is a further object of this invention to provide a mechanical sealing means for initially blocking off the circumferential zone where bolted, flanged pipes are abutted and which will permit the introduction of a suitable fluid sealant under pressure within that zone so that any further fluid leakage through the zone defined by each bolt and bolt hole will carry the sealant therethrough to effectively seal the leaking joint.

It is another important object of this invention to provide novel locating lugs to aid in efficient placement of the repair coupling.

It is a further object to provide a structure and means for sealing a leak of fluid from a line having a temperature range of from room temperature to 1500° F.

It is a further object of this invention to provide a reusable joint sealing means and to provide a method which will facilitate the on-site sealing of flanged joints which may be leaking high pressure and/or temperature fluid.

It is another important feature of this invention to provide means for protecting sealing gaskets, such as asbestos-mica, neoprene, or silicone gaskets, in a repair coupling against corrosive fluids which may be present in a line to be repaired by the coupling. The selection of a compatible plugging agent in accordance with this invention greatly extends the effective life of the gasket.

BRIEF DESCRIPTION OF THE DRAWINGS

FIGURE 1 is a perspective view of a repair coupling means in accordance with this invention, showing the coupling installed on a flanged and bolted pipe coupling;

FIGURE 2 is an elevational view of one portion of the repair coupling shown in FIGURE 1, showing that portion disassembled from the flanged pipe coupling;

FIGURE 3 is a plan view of the repair coupling portion illustrated in FIGURE 2, with sealing gasket sections removed for clarity;

FIGURE 4 is a fragmentary cross-sectional view, the plane of the section being indicated by the line 4—4 in FIGURE 1;

FIGURE 5 is a perspective view of one end of one portion of the repair coupling shown in FIGURE 1; and FIGURE 6 is a fragmentary cross-sectional view, the plane of the section being indicated by the line 6—6 in FIGURE 1.

DESCRIPTION OF THE PREFERRED EMBODIMENT

Referring now to the drawings, a cylindrical sealing and repair coupling 10 is illustrated in FIGURE 1. The repair coupling 10 includes upper and lower semicylindrical sections 11 and 12 respectively. The semicylindrical sections 11 and 12 are substantially identical and one of the sections (the upper section 11) will be described later in detail.

The repair coupling 10 is intended to seal a leaking flanged coupling formed by abutting pipe flanges 13 and 14. The pipe flanges 13 and 14 are A.S.A. raised face flanges which capture a gasket 15 between opposed raised faces 16 and 17. The flanges 13 and 14 further include recessed faces 18 and 19 respectively which define an annular zone or space 20 between those flanges.

A multiplicity of threaded studs 21 extend through a corresponding multiplicity of bores 22 and span the zone 20. Each threaded stud 21 is provided with a nut 23 at each projecting end so that, when the nuts 23 are tightened, the flanges 13 and 14 will compress the gasket 15 between the opposed raised faces 16 and 17.

Leakage through the gasket 15, upon failure of that gasket, will cause fluid flow primarily radially outwardly through the zone 20. This flow is arrested by the semicylindrical sections 11 and 12 in a manner which will hereinafter become apparent with reference to the section 11.

As may be seen in FIGURES 2–6, the section 11 has a semicylindrical inner face 24 which is provided with a pair of arcuately extending grooves 25a and 25b. The grooves 25a and 25b define an arcuately extending, central land. A gasket section 26 is provided within the groove 25a and extends along the entire extent of that groove section and, as may be seen most clearly in FIGURE 5, each end terminates just slightly beyond each end of the groove 25a and just above a pair of flange faces 27a of a pair of end flanges 27. Similarly, a gasket section 28 is arranged in the groove 25b and extends along the entire extent of that groove and terminates just above the face 27a and is coplanar with the end of the gasket 26.

A first semicylindrical girdering section 29 is welded at one edge to the surface 24. The girdering section 29 is made of sheet metal and is provided with a multiplicity of slots 30 at its opposite edge to accommodate a diameter reduction resulting from the shaping of the girdering member 29 to overhang the gasket 26. A second semicylindrical girdering section 31 is welded at one edge to the surface 24. The girdering section 31 is made of sheet metal and is provided with a multiplicity of slots 32 to accommodate a diameter reduction resulting from the shaping of the girdering member 31 to overhang the gasket 28.

Across recess 33 (FIGURE 3) is provided on each face 27a of each end flange 27 and communicates with the grooves 25a and 25b. Each end of the land 25 extends beyond the juncture between the grooves 25a and 25b so that each end of the land 25 is coplanar with each face 27a. A cross or end blocking gasket 34 (FIGURE 5) is received within each recess 33 and its upper surface is coplanar with the ends of the gasket sections 26 and 28.

A gasket retaining plate 35 is provided on each face 27a. Each retaining plate 35 is welded to the face 27a along one edge 36 and each plate 35 has a free end 37 which extends over the upper surface of each gasket 34 to retain each gasket 34 within its recess 33. Each plate 35 further includes side fingers 37 which extend radially inwardly with respect to the section 11 to restrain each gasket 34 against any substantial lateral deformation.

The semicylindrical sections 11 and 12 are applied around outer cylindrical faces 39 and 40 of the flanges 13 and 14 respectively and the semicylindrical sections 11 and 12 are fastened together to form the cylindrical repair coupling 10 by threaded end flange studs 41 and 42 and by nuts 43.

As the semicylindrical sections 11 and 12 are drawn together to form the cylindrical repair coupling 10, they are guided into axial alignment with the outer surfaces 39 and 40 of the flanges 13 and 14 by a plurality of locating lugs 44 which are welded around the periphery of the ends of the semicylindrical sections 11 and 12. The locating lugs 44 are particularly useful during the initial placement of relatively large and heavy semicylindrical sections about a flanged coupling, and are also useful in those situations where large amounts of high pressure fluid are escaping from the faulty pipe joint. In those latter instances the repairmen may have difficulty visually aligning the semicylindrical sections with the flanged joint.

As the semicylindrical sections 11 and 12 are drawn together, the girdering members 29 and 31 are brought into contact with the outer surfaces 39 and 40 of the flanges 13 and 14. As the nuts 43 are tightened, the portions of the girdering sections 29 and 31 which overhang the gaskets 26 and 28 apply pressure to those gaskets.

The gaskets 26 and 28 are preferably made from a rubberlike or elastomeric material which is free to flow in response to the pressure applied by the girdering members 29 and 31. The particular composition of the gaskets 26 and 28 depends upon the material carried in the pipe and the temperature of that material. Although rubber or rubber compounds, such as Buna-N, may be suitable for water or steam lines where the fluid temperature is below about 250° F., silicone or neoprene compositions may be employed for oil, gasoline, or natural gas lines. Silicone for oil and gasoline should be protected by sealant as discussed below. Silicone compositions may be employed where the temperature applied to the gasket does not substantially exceed 500° F. If the gasket is to be heated to a temperature of about 900° F., an asbestos-mica composition should be employed. As will hereinafter become more apparent, however, the gasket material employed in the sealing coupling according to this invention is effectively isolated from the pipe fluid by a sealant which is compatible with the gasket material and with the pipe line fluid. For 1,500° F., aluminum packing and Copaltite sealant and high temperature low creep steel is preferred.

Since the rubberlike material of the gaskets 26 and 28 is free to flow in response to the pressure applied by the girdering members 29 and 31, it may accommodate slight variations in the surfaces 39 and 40 to effectively seal the zone 20 against radial leakage. Such radial leakage is further eliminated between the faces 27a of the cooperating flanges 27, since each gasket 33 cooperates with an opposed gasket 33 to seal off any possible leakage between the flanges 27. The girdering members 29 and 31 prevent axial extrusion of the gaskets 26 and 28 along the surface 24 while the plates 35 prevent extrusion of the gaskets 34 relative to the faces 27a.

With the semicylindrical sections drawn into sealing engagement with the faces 39 and 40 (FIGURE 6), any leakage through the gasket 15 flows in the zone defined by the bolt hole 22 and the threaded stud 21. In the event that the gasket 15 is particularly faulty, it may be necessary to provide a relief valve 45 in one of the sections 11 and 12. The relief valve, when opened, provides an escape path for the fluid during the previously described assembly of the sections 11 and 12 about the flanged coupling.

A plurality of openings 46 are drilled radially through the sections 11 and 12. The valve 45 is initially threaded into one of the openings 46 and each other opening 46 is provided with a one-way check valve fitting 47. Each fitting 47 is similar to a conventional grease fitting so that a hand grease gun may be connected to such fittings.

To seal off any axial leakage in the zone between each threaded stud 21 and its bore 22 a hand grease gun (not shown) is filled with a suitable sealant and the nozzle of the gun is connected to a fitting 47. The hand gun should develop a pressure which is sufficient to overcome the pressure within the zone 20 so that the sealant will be forced into that zone. When the sealant reaches the zone defined by the threaded stud 21 and its hole 22, it will encounter a pressure drop due to the axial flow of leaking fluid through this zone. The sealant will thereby be carried along with the leaking fluid to surround the threaded stud 21 and to thereby seal off any axial leakage about that stud. When the operator notes the cessation of axial fluid leakage from the studs 21 which are adjacent the fitting 47 through which the sealant is being pumped, he removes the nozzle of the hand gun from that fitting and connects the gun nozzle to another fitting. The operation is repeated until there is no leakage from the flanged joint. As a result of the sealing operation, the entire zone 20 may be filled with sealant and this filled zone may act as a reservoir for possible future leakage along the threaded studs 21. The repair coupling 10 may be left in place to seal the flanged joint until the joint may be repaired during the next scheduled plant shutdown. The sections 11 and 12 may then be removed and reused for future repairs.

The sealant employed in the above-described sealing operation may comprise a high temperature sealing compound, such as Copaltite, available from National Engineering Products, Inc., Washington, D.C., for environments having temperatures between about 315° F. and 1,500° F.; a conventional grease-packing compound; Elco Plug Valve Sealant No. 355, available from the Elco Chemical Company, Berkeley, Calif., for environments having temperatures ranging from 40° F. to 500° F.; and Rockwell's Plug Valve Sealant No. 555 for environments having temperatures up to 350° F. In some instances, it may be desirable to inject a thermosetting resin as a sealant, but for normal applications it is preferable to employ a sealant which will not harden after performing its sealing function.

After all, or substantially all, of the fittings 47 have been injected with the sealant, the valve 45 is removed and replaced with a fitting 47; and that fitting may be supplied with sealant if necessary.

During the time that the repair coupling 10 surrounds the flanged joint, it may be necessary to supply further sealant to one or more of the fittings 47. It should be appreciated, however, that any such further sealing operations may be easily performed by using the aforementioned sealing gun.

The sealant employed not only prevents leakage from the flanged joint, but also insulates the gaskets 26, 28, and 34 against corrosive fluids carried in the pipe line.

The invention is not restricted to the slavish imitation of each and every one of the details set forth above. Obviously, devices may be provided which change, eliminate, or add certain specific details without departing from the scope of the invention.

What is claimed is:

1. In a flanged pipe joint assembly having flanges which include flange faces defining a joint between adjacent pipes, said joint being formed by first gasket means pressed between inner annular portions of said flange faces with the remainder of said flange faces spaced apart, a plurality of aligned fastener holes in each flange, said flanges having a cylindrical outer surface, a fastener through each pair of aligned holes, the improvement comprising a sealing means for sealing fluid leakage in said joint defined by said flanges and fluid leakage along zones defined by each fastener and each hole, said sealing means comprising a cylinder surrounding said cylindrical outer surface of each flange, second gasket means between said cylinder and the cylindrical outer surface of each flange on both sides of the space defined by said flanges, said second gasket means being compressed between an inner surface of said cylinder and the outer surface of said flanges, and means for admitting pressurized fluid sealant to a zone defined by said cylinder, said first and second gasket means, said spaced apart flange faces and said holes, whereby said sealant may flow into a space between each fastener and each hole.

2. A flanged pipe joint assembly according to claim 1 wherein said sealing means comprises semicylindrical sections and means joining said sections at their ends to form said cylinder.

3. A flanged pipe joint assembly according to claim 2 wherein each of said semicylindrical sections cover the entire axial extent of the flanges and have end faces which do not extend substantially beyond the axial extent of said flanges.

4. A flanged pipe joint assembly according to claim 1 wherein the end faces of each of said semicylindrical sections are provided with a plurality of radially inwardly extending lugs.

5. A flanged pipe joint assembly according to claim 1 including passage means through said cylinder providing a flow path for said fluid during application of said cylinder to said flange, said passage means having valve means to close said passage after said cylinder is applied to said flange.

6. A method of sealing leaks in flanged pipe joints having flanges which include flange faces defining a joint between adjacent pipes, said joint being formed by first gasket means pressed between inner annular portions of said flange faces with the remainder of said flange faces spaced apart, a plurality of aligned fastener holes in each flange, said flanges having a cylindrical outer surface, a fastener through each pair of aligned holes, said first gasket means having at least one leak defining path therethrough, comprising the steps of applying a seal over said cylindrical outer surface of each flange and admitting pressurized fluid sealant to a zone defined by said seal, said gasket means, the space between said flange faces, and said holes, whereby said sealant is carried by fluid pressure escaping through said leak passage into a space between each fastener and each hole.

References Cited

UNITED STATES PATENTS

| | | | |
|---|---|---|---|
| 793,589 | 6/1905 | Kellogg | 138—97 |
| 1,800,085 | 4/1931 | Kroeger et al. | 138—97 XR |
| 2,547,321 | 4/1951 | Henderson | 285—94 XR |
| 2,721,581 | 10/1955 | Risley et al. | 138—97 |
| 2,778,662 | 1/1957 | Smith | 138—99 XR |
| 3,017,204 | 1/1962 | Smith | 285—373 |

H. HAMPTON HUNTER, Primary Examiner

U.S. Cl. X.R.

285—94, 292